(12) United States Patent
Zinser

(10) Patent No.: US 7,583,191 B2
(45) Date of Patent: Sep. 1, 2009

(54) SECURITY SYSTEM AND METHOD FOR USE OF SAME

(76) Inventor: Duke W. Zinser, 7514 Briarglen Ct., Garland, TX (US) 75044-2426

( * ) Notice: Subject to any disclaimer, the term of this patent is extended or adjusted under 35 U.S.C. 154(b) by 317 days.

(21) Appl. No.: 11/559,808

(22) Filed: Nov. 14, 2006

(65) Prior Publication Data

US 2008/0111684 A1    May 15, 2008

(51) Int. Cl.
G08B 13/00    (2006.01)
(52) U.S. Cl. .................................... 340/541; 340/539.1
(58) Field of Classification Search ................. 340/541, 340/506, 539.1; 348/152, 140.1; 455/556.1
See application file for complete search history.

(56) References Cited

U.S. PATENT DOCUMENTS

| | | | |
|---|---|---|---|
| 5,861,804 A | 1/1999 | Fansa et al. | |
| 5,907,352 A | 5/1999 | Gilley | |
| 6,023,223 A | 2/2000 | Baxter, Jr. | |
| 6,049,353 A | 4/2000 | Gray | |
| 6,060,994 A | 5/2000 | Chen | |
| 6,073,192 A | 6/2000 | Clapp et al. | |
| 6,094,213 A | 7/2000 | Mun et al. | |
| 6,097,429 A | 8/2000 | Seeley et al. | |
| 6,226,031 B1 | 5/2001 | Barraclough et al. | |
| 6,271,752 B1 | 8/2001 | Vaios | |
| 6,429,893 B1 | 8/2002 | Xin | |
| 6,466,261 B1 | 10/2002 | Nakamura | |
| 6,476,858 B1 | 11/2002 | Ramirez Diaz et al. | |
| 6,542,078 B2 | 4/2003 | Script et al. | |
| 6,590,604 B1 | 7/2003 | Tucker et al. | |
| 6,658,091 B1 * | 12/2003 | Naidoo et al. | ................. 379/37 |
| 6,661,340 B1 | 12/2003 | Saylor et al. | |
| 6,714,237 B2 | 3/2004 | Lee et al. | |
| 6,727,811 B1 | 4/2004 | Fendis | |
| 6,753,899 B2 | 6/2004 | Lapalme et al. | |
| 6,778,084 B2 * | 8/2004 | Chang et al. | ................. 340/541 |
| 6,873,261 B2 | 3/2005 | Anthony et al. | |
| 6,965,313 B1 | 11/2005 | Saylor et al. | |
| 7,015,943 B2 | 3/2006 | Chiang | |
| 7,020,474 B2 | 3/2006 | Scott | |
| 7,030,752 B2 | 4/2006 | Tyroler | |
| 7,030,753 B2 * | 4/2006 | Hentz et al. | ................. 340/531 |
| 7,034,681 B2 | 4/2006 | Yamamoto | |
| 7,193,644 B2 * | 3/2007 | Carter | ..................... 348/14.06 |
| 2006/0022816 A1 | 2/2006 | Yukawa | |

* cited by examiner

Primary Examiner—Toan N Pham
(74) Attorney, Agent, or Firm—Scott T. Griggs; Griggs Bergen LLP

(57) ABSTRACT

A security system and method for use of the same are disclosed that provide for remote surveillance. In one embodiment, a property's entry point such as a doorway is equipped with a video camera, an external microphone, and an external speaker. An individual, such as an owner of the property, is away from the property and equipped with a cellular telephone. When a person arrives at the entry point, a control unit relays audio and visual data captured by the video camera and the external microphone to the individual's cellular telephone. Similarly, the control unit relays audio data from the owner to the person at the entry point.

20 Claims, 3 Drawing Sheets

SECURITY SYSTEM AND METHOD FOR USE OF SAME

TECHNICAL FIELD OF THE INVENTION

This invention relates, in general, to security systems and, in particular, to a security system and accompanying method for use of the same for providing remote surveillance and communication with a doorway or other point of entry.

BACKGROUND OF THE INVENTION

Security systems are typically used to monitor alarms and connect an onsite control unit to a predetermined third party. For example, security systems may utilize a direct phone wire (or tamper-resistant fiber optic cable) to connect the control unit to a third party security monitoring service or, in some high end systems, to a first responder via. Onsite speaker phones allow for the third party to speak with the intruder. In the instance of an actual break-in, the speaker phone may be used to sound an alarm or to allow a person to urge the intruder to cease and desist as response units have been dispatched. These existing security systems are reactive, however, and a need exists for a security system that provides a proactive solution of surveillance that deters potential burglars and other unwanted individuals.

SUMMARY OF THE INVENTION

A security system and method for use of the same are disclosed that provide for remote surveillance of an entry way of a property in order to deter potential burglars and other unwanted individuals. In one embodiment, a property's entry point such as a doorway is equipped with a video camera, an external microphone, and an external speaker. An individual, such as an owner of the property, is away from the property and equipped with a cellular telephone. When a person arrives at the entry point, a control unit relays audio and visual data captured by the video camera and the external microphone, respectively, to the individual's cellular telephone. Similarly, the control unit relays audio data from the owner to the person at the entry point. The systems and methods presented herein thereby provide a proactive solution of surveillance that deters potential burglars and other unwanted individuals.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
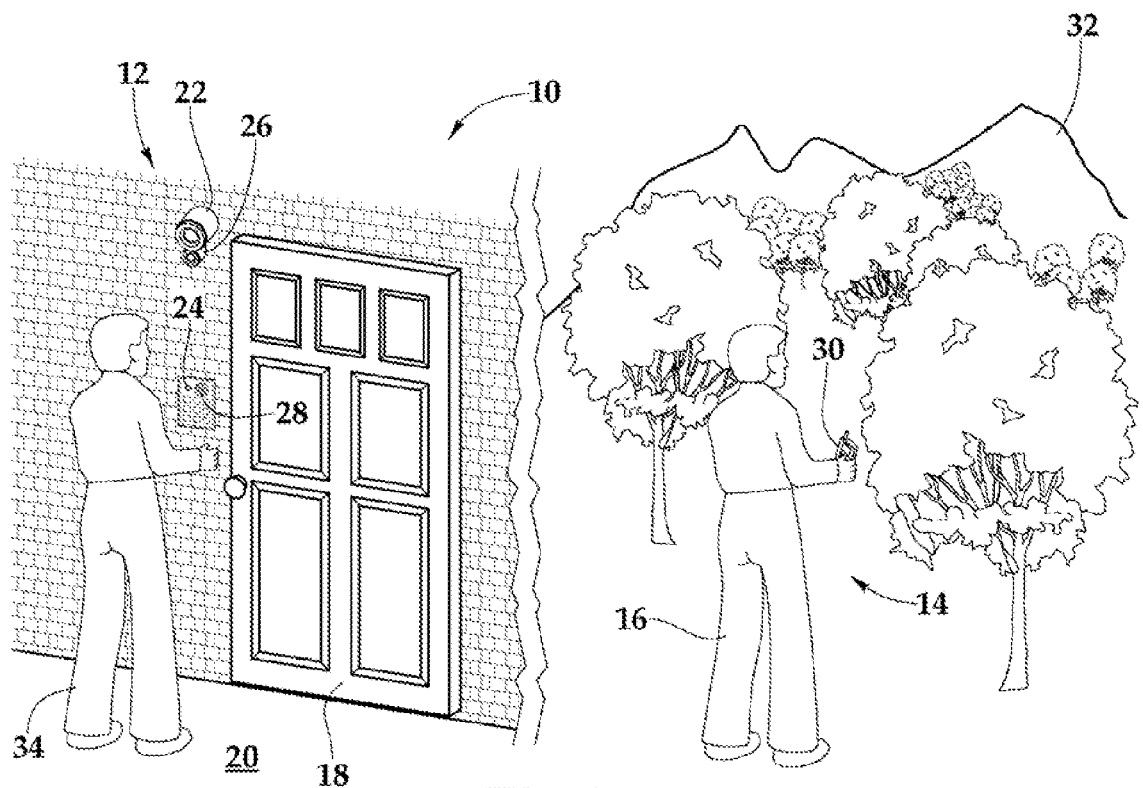
FIG. 1 is a perspective illustration of an entry point equipped with one embodiment of the security system described herein and a remote location wherein an individual is utilizing the security system to monitor the entry point.

Referring initially to FIG. 1, therein is depicted an illustration of one embodiment of the security system 10 described herein being utilized at an entry point 12. Further, a remote location 14 is depicted wherein an individual 16 is utilizing the security system 10 to monitor the entry point 12 which includes a doorway 18 to a home having an environment 20. It should be appreciated that the security system 10 described herein may be utilized with any type of structure and entry point 12. In particular, the security system 10 presented herein is well suited for doorways at houses, apartments, lofts, condominiums, and townhouses, for example.

A video camera 22 and an external microphone 24 are disposed in the doorway 18. A proximity detector 26 and an external speaker 28 are also disposed in the doorway 18. A cellular telephone 30 is disposed in the possession of the homeowner 16 who is away from the home in a park 32. It should be appreciated, however, that any homeowner location is within the teachings of the present invention. For example, the homeowner 16 may be in the backyard of the home or in a remote site such as an office. Moreover, the teachings presented herein apply to persons, such as family members, security personal, or friends, for example, other than the homeowner 16 that are monitoring or assisting with the monitoring of the home.

In operation, an individual 34 approaches the doorway 18 and the proximity detector 26 is actuated. In turn, the video camera 22 and external microphone 24 capture visual and audio communications at the doorway 18. At least a portion of the data related to the captured doorway visual and audio communications is transmitted to the cellular telephone 30 of the homeowner 16 via a control unit that is in communication with the video camera 22, external microphone 24, proximity detector 26, and exterior speaker 28 as well as a cellular network for communicating with the cellular telephone 30.

Similarly, the control unit relays captured cellular audio communications from the homeowner 16 to the external speaker 28. In this manner, the homeowner is permitted to monitor the home in substantially realtime while away and, further, the homeowner 16 and individual 34 are able to communicate as if the homeowner 14 was at home. In particular, the individual 34 will be believe that the homeowner 16 is home.

Accordingly, the security system 10 and accompanying method presented herein permit the homeowner 16 or designated entity or individual, who may be onsite or at a remote location, to view and talk to a visitor (or perpetrator) in realtime or substantially realtime, without the homeowner's location being disclosed. The visitor (or perpetrator) can hear the homeowner's voice but cannot see the homeowner, since the video is communicated one-way from the doorway 18 to the cellular telephone 30 of the homeowner 16. In application, an honest visitor with good intentions will assume that the homeowner 16 is on premises. Similarly, a perpetrator will assume that the homeowner 16 is at home and the perpetrator can be expected to move on if his motives are unlawful.

Further, in another embodiment, the security system 10 includes a plurality of video cameras 22 positioned around the perimeter of the property. The video cameras 22 may be each be motion activated and begin recording video in response to actuation at any type of entryway to any time of property or structure. In this implementation, a triggering event such as the ringing of a doorbell, initiates the contact of the control unit to the homeowner 16; however, the plurality of video cameras 22 collect video for the homeowner's review irrespective of the occurrence of the triggering event.

Figure 2:
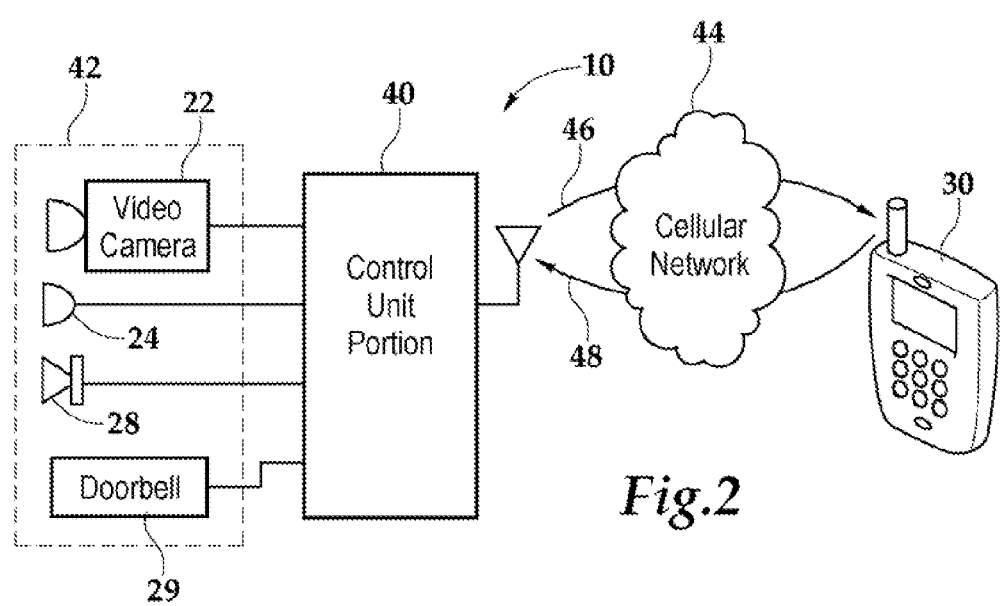
FIG. 2 is a functional block diagram of one embodiment of the security system.

FIG. 2 depicts one embodiment of the security system 10. A control unit portion 40, or control unit 40, controls a communication portion 42 and relays data and communications between the communication portion 42 and the cellular telephone 30 via a cellular network 44. As illustrated, the communication portion 42 includes the video camera 22, the exterior microphone 24, the exterior speaker 28 and a doorbell 29, which may included as part of the communication portion 42 in particular embodiments. Preferably, the control unit 40 is located onsite with the components of the communication portion 42 and each of the components of the communication portion 42 may be connected to the control unit portion by a wired connection, such as a conventional circuit board or internal computer connection, a Category 5 (CAT 5) cable, or coaxial cable, for example, a wireless connection scheme, such as a network utilizing wireless local area technology or radio frequency technology, for example, or some combination thereof.

The cellular telephone network or cellular network 44 is employed to relay visual and audio data from the control unit to the cellular telephone 30 and relay audio data and control signals from the cellular telephone 30 to the control unit 40. Several cellular telephone systems are available to provide the communication exchanges. By way of non-limiting examples, an exemplary list of cellular telephone systems is presented in Table 1.

TABLE 1

Exemplary Cellular Telephone Systems

| Cellular Telephone System | Generation | Channel Spacing | Access Method |
| --- | --- | --- | --- |
| CDMAONE | 2 G | 1.25 MHZ | CDMA |
| CDMA2000 1x | 2.5 G | 1.25 MHZ | CDMA |
| CDMA2000 1xEV-DO | 3 G | 1.25 MHZ | CDMA |
| CDMA2000 1xEV-DV | 3 G | 1.25 MHZ | CDMA |
| UMTS | 3 G | 5 MHZ | CDMA/TDMA |
| TD-SCDMA | 3 G | 1.6 MHZ | CDMA |

Before continuing with the discussion of FIG. 2 in paragraph 24, the cellular telephone systems of Table 1 will be briefly discussed. The CDMAONE cellular telephone system is the brand name for the standard reference IS95, which was the first CDMA system to gain widespread use. The initial specification for the system was IS95A, but its performance has since been upgraded under IS95B. Apart from voice, the CDMA cellular telephone system carries data at rates up to 14.4 kbps for IS95A and up to 115 kbps for IS95B.

The CDMA2000 1x cellular telephone system supports both voice and data capabilities within a standard 1.25 MHZ CDMA channel. This system doubles the voice capacity of CDMAONE systems and also supports high-speed data services. Rates of 153 kbps are currently available and greater data transfer rates are planned.

The CDMA2000 1xEV-DO or Evolution Data Only standard builds on the CDMA2000 standard and provides peak data rate capability of over 2.45 Mbps on a downlink, i.e., from the base station to the user. The CDMA2000 1xEV-DV or Evolution Data and Voice cellular telephone system can simultaneously transmit voice and data with a peak data rate of 3.1 Mbps on the forward link or downlink and 384 kbps on the reverse link.

The UMTS (Universal Mobile Telecommunications System) utilizes Wideband CDMA with one 5 MHZ wide channel for both voice and data that provides speeds of up to 2 Mbps. The Time Division Synchronous CDMA or TD-SCDMA cellular telephone system, which is not popular in the United States, utilizes different time slots for base states and mobiles to communicate. It should be appreciated that the security system presented herein is not limited to any one particular cellular telephone system and systems not presented herein are within the teachings of the present invention. Additionally, the cellular telephone networks discussed herein may include systems which utilize the public switched telephone network (PSTN), satellite-based networks, and other systems known in the art.

Also, the cellular telephone networks described herein may include or employ the Internet, and associated protocols, which can be utilized by some models of cellular telephones to receive images as well as audio and visual data. In the instances when data is transferred to or from the cellular telephone via the Internet, the cellular network 44 may include onsite (or home) or offsite servers that are setup by a security company or the homeowner to facilitate the transfer of the data.

The cellular telephone 30 may comprise any long-range, portable electronic device that provides for peer-to-peer telecommunications over a long distance. The cellular telephone 30 may comprise a personal digital assistant (PDA) or other electronic communication device. As illustrated, the cellular telephone 30 receives signals 46 and sends signals 48. The signals 46 from the control unit 40 to the cellular telephone 30 may include voice, images, and video signals. The signals 48 to the control unit 40 may comprise voice and control signals. In addition to the voice function of the cellular telephone 30, the image, video, and data services of the cellular phone may be provided by a short message service (SMS) which utilizes text messaging, email, packet switching for access to the Internet to provide the content. Other suitable services for providing the content needed by the cellular telephone 30 include a multimedia message service (MMS) for sending and receiving photos and video. It should be appreciated, however, that the data and content received by the cellular telephone 30 is not limited to these services.

In an alternate embodiment, the video camera 22 may be integrated into the doorbell 29 and the integrated components disposed in communication with the control unit portion 40 such that the actuation of the doorbell establishes communication from the control unit portion 40 to the cellular telephone 30. The initial communication from the control unit portion 40 to the cellular telephone 30 may be considered a notification and it may take the form of a page, email, text message, instant message, phone call or any other type messaging and it may be achieved through any type of network including the illustrated cellular network 44. In response to the notification, the homeowner 16 may send a signal to the control unit portion 40 to either ignore the notification and event or accept more information including images or video about the notification and event. It should be appreciated that the instant security system provides flexibility and selectability in the manner in which the homeowner 16 receives notifications and alerts.

Figure 3:
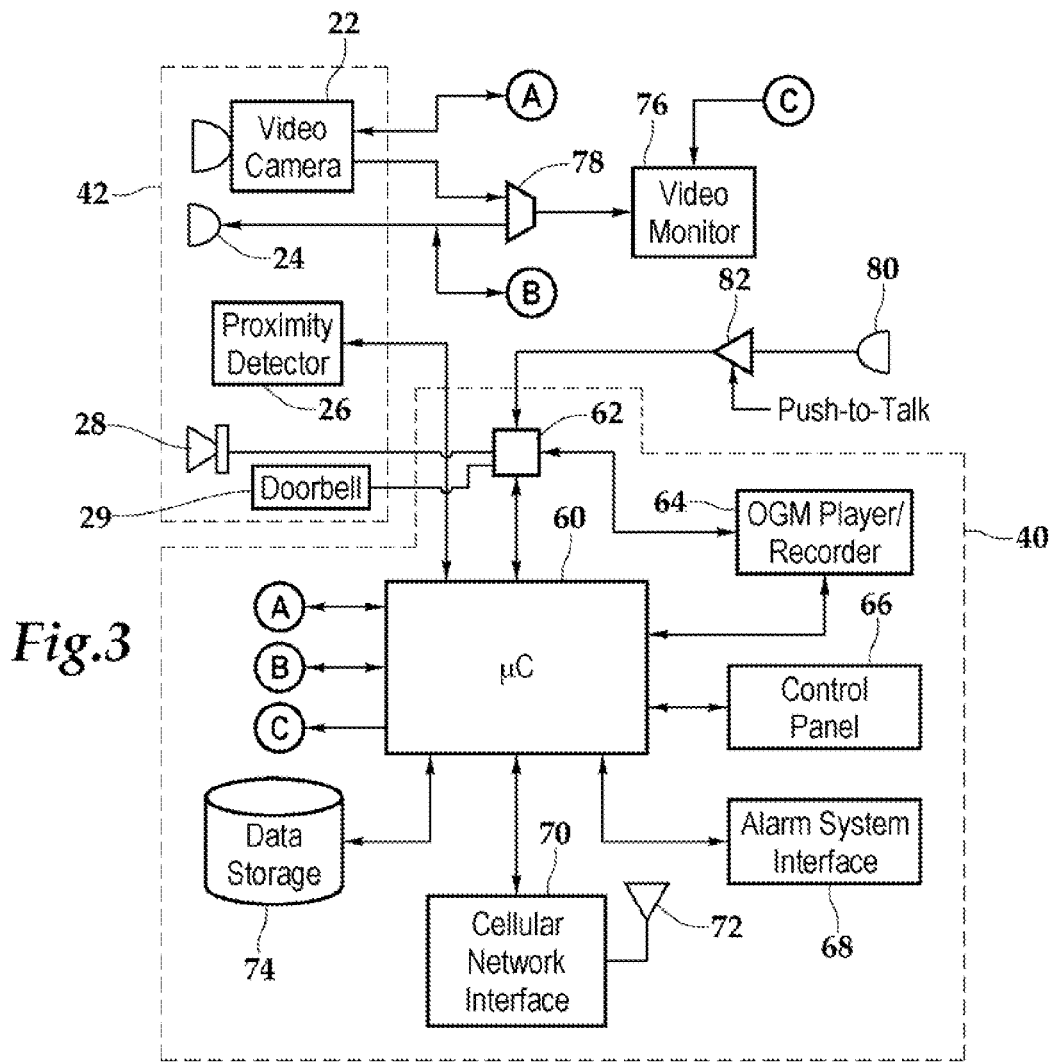
FIG. 3 is a functional block diagram of one embodiment of communication and control units which form portions of the security system.

FIG. 3 depicts one embodiment of control and communication units 40 and 42 which form portions of the security system 10. A microcontroller 60 controls the communication unit 42 and interfaces with the cellular network 44. More specifically, the microcontroller 60 contains all the processing, memory, and interfaces needed for supporting the functionalities of the control unit 40 and communications unit 42. Numerous components are connected to the microcontroller 60; namely, the video camera 22, the exterior microphone 24, and the proximity detector 26 of the communication unit 42.

Further, the components of the control unit 40 which are connected to the microcontroller 60 include a switch 62, an outgoing message (OGM) player/recorder 64, a control panel 66, an alarm system interface 68, a cellular network interface 70 having an antenna 72, and a data storage unit 74. Additionally, components, which are not illustrated as part of the communications unit 42, are connected to the microcontroller 60. A video monitor 76 is coupled to the microcontroller 60 as well as to the video camera 22 and the exterior microphone 24 through a multiplexer 78. It should be appreciated that these components described in FIG. 3 may be connected to the microcontroller 60 and interconnected by wired connections, wireless connections, or a combination thereof.

The switch 62, which is under the control of the microcontroller 60, administers access to the exterior speaker 28 and determines which input device drives a signal to the exterior speaker 28. In the illustrated implementation, the possible input devices include the OGM player/recorder 64, an interior microphone 80 having a push-to-talk circuit 82, and the cellular telephone 30 via the cellular network interface 70 and the antenna 72. The OGM player/recorder 64 is a device for presenting pre-recorded messages to visitors at the homeowner's local or remote instructions. For example, the homeowner may have a pre-recorded greeting giving specific instructions on where to leave a package. The homeowner may utilize the control panel 66, which may be positioned proximate to the interior microphone 80, to send a signal to the OGM player/recorder 64 to tell a visitor from an overnight delivery service where to leave a package. Alternatively, the homeowner may send a signal to the OGM player/recorder with the cellular telephone 30 as will be discussed in further detail hereinbelow.

In general, the control panel 66 permits the homeowner or other individual to manage the security system 10. In one implementation, the control panel 66 is onsite as well as accessible through the cellular telephone 30. The alarm system interface 68 interfaces the security system 10 described herein with the homeowner's existing home security system. By way of example, this feature permits the homeowner to utilize the cellular telephone 30 to notify a home security company or the police department in the instance of a break-in or other crime.

As previously discussed, the cellular network interface 70 and antenna 72 connect the security system 10 with the cellular network 44. The data storage unit 74 comprises a recordable medium for storing data relevant to the security system 10. For example, the video and audio data gathered by the video camera 22 and the exterior microphone 24, respectively, may be stored at the data storage unit 74. Moreover, data stored in the data storage unit 74 may be transferred to a different medium or played on the video monitor 76. The video monitor 76 is preferably located onsite at the home and renders in substantially realtime the visual and audio data collected by the video camera 22 and external microphone 24. The internal microphone 80 with the push-to-talk circuit 82 allows an onsite homeowner or, as previously discussed, another individual, to talk to a visitor. The video monitor 76 and interior microphone 80, when used together, provide a traditional monitor with intercom system for the homeowner.

Figure 4:
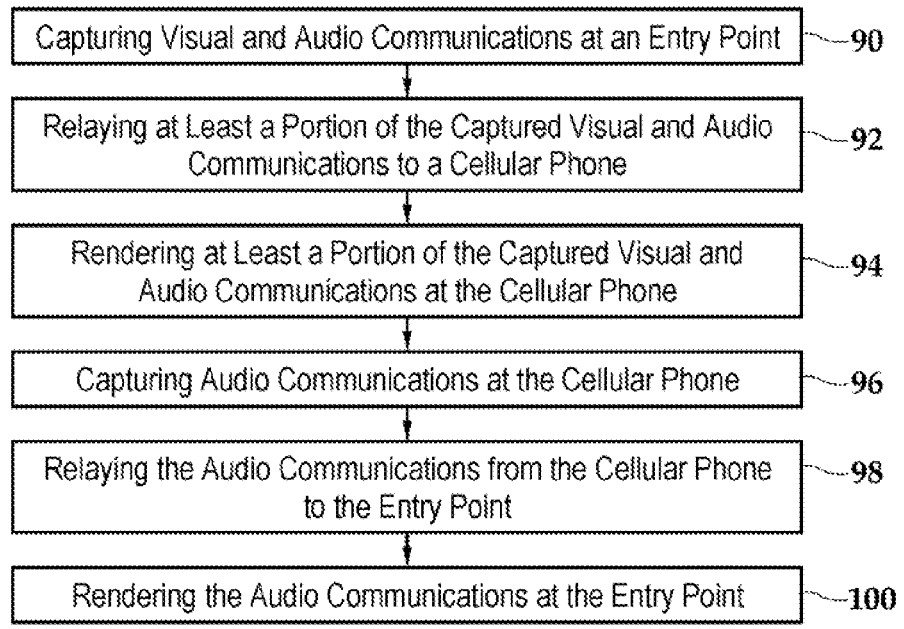
FIG. 4 is a flow chart depicting one embodiment of a method for providing security.

FIG. 4 depicts a flow chart of one embodiment of a method for providing security. At block 90, visual and audio communications are captured at an entry point. At block 92, at least a portion of the captured visual and audio communications are relayed to a cellular telephone. At block 94, the at least a portion of the captured visual and audio communications are rendered at the cellular telephone. At block 96, audio communications are captured at the cellular phone. The audio communications are relayed from the cellular phone to the entry point at block 98. At block 100, the audio communications are rendered at the entry point, thereby providing for duplexed audio communications and one-way visual observation in order to achieve an improvement over the traditional video monitor and intercom system.

Figure 5:
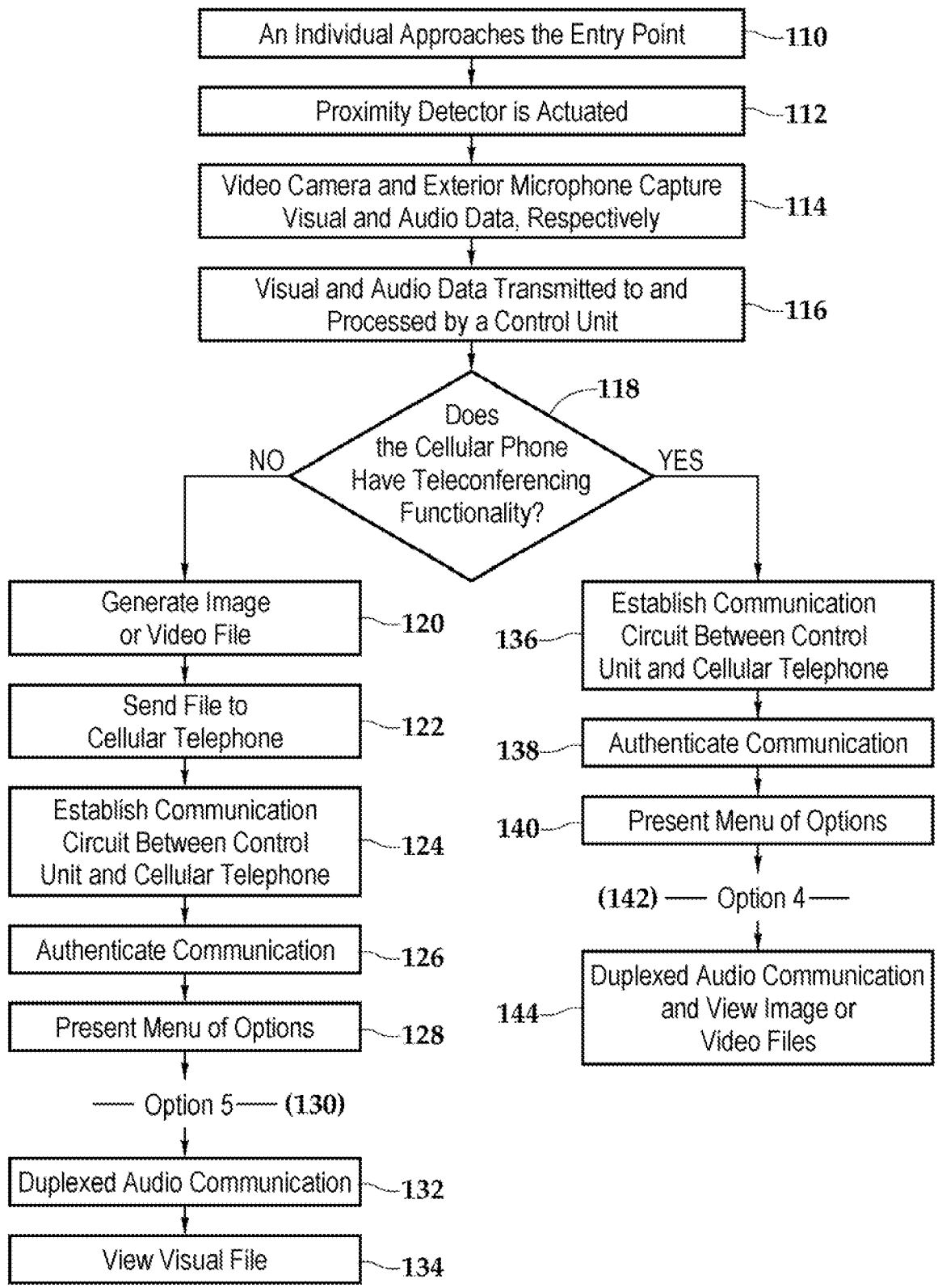
FIG. 5 is a flow chart depicting another embodiment of a method for providing security.

FIG. 5 depicts a flow chart of another embodiment of a method for providing security. At block 110, an individual approaches the entry point. As a result, a proximity detector is actuated at block 112 and, in turn, as shown in block 114, the video camera and exterior microphone begin capturing visual and audio data, respectively. This visual and audio data is rendered on the video monitor for individuals including the homeowner (if home) inside the home to digest. At block 116, the data is transferred to the control unit. This operation may occur substantially simultaneously with or even prior to the operations of block 114. At the control unit, in one implementation, the data is stored in the data storage.

At block 118, if the cellular telephone has teleconferencing functionality or the ability to simultaneously receive both data and voice, then the method advances to block 136 (see paragraph 41). On the other hand, if this functionality is not present in the cellular telephone or if the cellular telephone network being utilized does not support this type of functionality, then the method advances to block 120 wherein the control unit generates an image or video file that includes at least a portion of the visual or audio/visual data collected by the video camera and the exterior microphone. Whether an image file or video file is generated depends on the preferences programmed into the instant security system as well as the capabilities of the cellular network and the cellular telephone.

At block 122, the file is sent from the control unit to the cellular telephone via the cellular network. At block 124, an audio communication circuit between the control unit and the cellular telephone is completed. At block 126, the identity of the homeowner is authenticated. By way of example, in one implementation, the homeowner may be required to enter a passcode to authenticate the identity of the homeowner. If the homeowner does not enter the passcode, then the call is disconnected. As a further benefit, this type of call authentication or a similar system prevents the control unit from connecting the visitor with the homeowner's voicemail. Accordingly, the homeowner and security system do not provide an unintentional indication to the visitor that the homeowner is not home. Additionally, the homeowner may preprogram the control unit to play a pre-recorded message from the OGM player/recorder for the visitor if the call is disconnected or not answered and authenticated.

At block 128, the homeowner is presented with a menu of options that give the homeowner choices in how to handle the visitor's arrival to the home. The homeowner may select an option in a conventional manner such as by pressing a number on the cellular telephone corresponding to the number of the option. Alternatively, for example, a voice activated system may be utilized. By way of example and not by way of limitation, Table 2 presents a matrix that illustrates a portion of the options that the security system of the present invention can make available to the homeowner. Each of these options will be briefly described before returning to the description of FIG. 5 in paragraph 40.

TABLE 2

Options for Cellular Telephones without Teleconferencing Functionality

| Option Number | Option |
| --- | --- |
| 1 | No Action |
| 2 | Play a Pre-Recorded Greeting |
| 3 | Request Further Image or Video Data |
| 4 | Hear Audio Only |
| 5 | Duplexed Audio Communication |
| 6 | Notify Alarm Company |
| 7 | Conference Call |

With respect to Option 1: No Action, the approaching individual that actuated the security system may be a family member returning home and entering the home through the front door. In this instance, the homeowner may wish to take no action. In this mode, the security system does not facilitate communication between the parties and the visitor is ignored by the security system.

With respect to Option 2: Play a Pre-Recorded Greeting, the approaching individual may be a delivery person that wishes to leave a package for the homeowner. The homeowner may select to play a pre-recorded greeting with detailed instructions describing where to leave the package for the delivery person with the OGM player/recorder. It should be appreciated that the security system may be equipped with more than one pre-recorded greeting. By way of further example, the homeowner may be in a remote part of the home or property and play a pre-recorded greeting for a friend that has approached the doorway which politely asks the visiting friend to wait at the door for a couple of minutes. A submenu or other conventional means may be employed to offer the homeowner a choice of pre-recorded messages to play for the visitor.

With respect to Option 3: Request Further Image or Video Data, the initial file received by the homeowner at the cellular telephone may be blurred or the visitor in the doorway may not be clearly identifiable from the image or video. With this option, the homeowner requests an additional image or video. When this option is selected, since the cellular telephone does not have teleconferencing functionality or the ability to simultaneously receive both voice and data, the control unit temporarily disconnects from the cellular telephone, sends the second image or video file, and then reestablishes audio communication with the cellular telephone. After the audio circuit is reestablished and optionally re-authenticated, the menu may be represented to the homeowner.

When Option 4: Hear Audio Only is selected by the homeowner, the homeowner chooses only to observe the visitor before taking further action, such as selecting a further option. Option 5: Duplexed Audio Communication permits the homeowner to have a verbal conversation with the visitor in the same manner as if the homeowner was present at the home and using the internal microphone. Option 6: Notify Alarm Company allows the homeowner to notify the alarm company or alternatively the police department of a potential or actual problem. This option is particularly important when the visitor is a perpetrator in the act of a crime such as breaking into the home. With respect to Option 7: Conference Call, the homeowner may conference call a third-party, such as a trusted neighbor that is home, into the conversation with the visitor. As alluded to, these options are exemplary of the robustness of the security system and these options may be original equipment manufacture (OEM) or programmed by the homeowner.

Returning now to the description of FIG. 5, as indicated by numeral 130, the homeowner selects Option 5: Duplexed Audio Communication to have a two-way conversation with the visitor. At block 134, the homeowner views the visual file. This operation may occur at any time or simultaneously with the operations described in blocks 124 through 132. The operations of blocks 132 and 134 permit the homeowner who may be onsite or at a remote location, to view and talk to a visitor (or perpetrator) in realtime or substantially realtime, without the homeowner's location being disclosed.

Returning now to decision block 118, for cellular telephones that have teleconferencing functionality or an equivalent thereof, at block 136, a communication circuit is established between the control unit and cellular telephone. As previously alluded to, by way of example, some cellular telephones provide for the simultaneous or near simultaneous transfer of voice and data by utilizing the cellular network in conjunction with the Internet. At block 138, similar to block 126, the identify of the homeowner is authenticated. Continuing to block 140, a menu of options, such as the exemplary menu of Table 3, is available to the homeowner.

TABLE 3

Options for Cellular Telephones with Teleconferencing or Equivalent Functionality

| Option Number | Option |
| --- | --- |
| 1 | No Action |
| 2 | Play a Pre-Recorded Greeting |
| 3 | Observe Only |
| 4 | Duplexed Communication |
| 5 | Notify Alarm Company |
| 6 | Conference Call |

These available options, where serve as non-limiting examples, are substantially equivalent to the options discussed at block 128. As indicated in FIG. 5, Option 4: Duplexed Communication is selected. Since the telephone has the ability to simultaneously receive data and voice communications, this option permits the cellular telephone to render a video file with substantially real time video visual and audio captured at the doorway of the home. Alternatively, streaming audio and video may be delivered. The homeowner is therefore allowed to see and hear the visitor while communicating with the visitor orally.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A doorbell monitoring system comprising:
   a doorway having an environment;
   a doorbell located in the doorway, the ringing of the doorbell being a triggering event;
   a video camera and an external microphone disposed in the entry point, the video camera and external microphone, responsive to the triggering event, for capturing entry point visual and audio communications at the entry point and transmitting the captured entry point visual and audio communications;
   an external speaker disposed in the entry point, the external speaker for rendering received cellular audio communications;
   a control unit disposed in communication with the video camera, the doorbell, and the external microphone, the control unit for communicating at least one portion of the entry point visual and audio communications received from the video camera and external microphone, and for communicating the received cellular audio communications to the external speaker; and a cellular telephone disposed remotely to the doorway and the control unit, the cellular telephone for capturing cellular audio communications at the cellular telephone, transmitting the cellular audio communications to the control unit, and rendering the at least one portion of entry point communications received from the control unit.

2. The system as recited in claim 1, wherein the video camera and the external microphone are integrated.

3. The system as recited in claim 1, wherein the external microphone and speaker are integrated.

4. The system as recited in claim 1, wherein the control unit is disposed in communication with the video camera and the external microphone by a communication link selected from the group consisting of wireless links and physical links.

5. The system as recited in claim 1, wherein the at least one portion of the entry point visual and audio communications comprises data selected from the group consisting of audio data, at least one image and audio data, and streaming visual and audio data.

6. The system as recited in claim 1, wherein the cellular telephone comprises teleconferencing functionality.

7. The system as recited in claim 1, wherein the connection between the control unit and cellular telephone comprises a network connection over a cellular network.

8. A method for providing doorbell monitoring, the method comprising:
    ringing of a doorbell at an entry point;
    responsive to the ringing of the doorbell, capturing visual and audio communications at the entry point;
    relaying at least a portion of the captured visual and audio communications to a cellular phone;
    rendering the least a portion of the captured visual and audio communications at the cellular phone;
    capturing audio communications at the cellular phone;
    relaying the audio communications from the cellular phone to the entry point; and
    rendering the audio communications at the entry point.

9. The method as recited in claim 8, wherein the operation of relaying at least a portion of the captured visual and audio communications and the operation of relaying the audio communications for the cellular phone occur substantially simultaneously.

10. The method as recited in claim 8, wherein the operation of relaying at least a portion of the captured visual and audio communications and the operation of relaying the audio communications for the cellular phone generate duplexed audio communication.

11. The method as recited in claim 8, further comprising forwarding the captured visual and audio communications to a data storage device located onsite to the entry point.

12. The method as recited in claim 8, further comprising forwarding the captured visual and audio communications to a video monitor located onsite to the entry point.

13. The method as recited in claim 8, further comprising enabling the captured visual and audio communications with the cellular phone using a network selected from the group consisting of a Public Switched Telephone Network (PSTN), a satellite-based network, and the Internet.

14. A doorbell monitoring system comprising:
    a doorbell located at an entry point;
    means, responsive to the ringing of the doorbell, for capturing visual and audio communications at the entry point;
    means for relaying at least a portion of the captured visual and audio communications to a cellular phone;
    means for rendering the least a portion of the captured visual and audio communications at the cellular phone;
    means for capturing audio communications at the cellular phone;
    means for relaying the audio communications from the cellular phone to the entry point; and
    means for rendering the audio communications at the entry point.

15. The system as recited in claim 14, wherein the means for relaying at least a portion of the captured visual and audio communications and means for relaying the audio communications for the cellular phone operate substantially simultaneously.

16. The system as recited in claim 14, wherein the means for relaying at least a portion of the captured visual and audio communications and the means for relaying the audio communications for the cellular phone operate to provide duplexed audio communication.

17. The system as recited in claim 14, further comprising means for forwarding the captured visual and audio communications to means for data storage located onsite to the entry point.

18. The system as recited in claim 14, further comprising means for forwarding the captured visual and audio communications to a video monitor located onsite to the entry point.

19. A system for providing doorbell monitoring, the system comprising:
    a doorway to a home having an environment;
    a doorway located in the doorway, the ringing of the doorbell being a triggering event;
    a video camera and an external microphone disposed in the doorway, the video camera and external microphone for, when actuated, by the triggering event, capturing doorway visual and audio communications at the doorway and transmitting the captured doorway visual and audio communications;
    a proximity detector disposed in the doorway, the proximity detector for actuating the video camera and the external microphone in response to an individual approaching the doorway;
    an external speaker disposed in the doorway, the external speaker for rendering received cellular audio communications;
    a control unit disposed in communication with the video camera, the doorbell, and the external microphone, the control unit for communicating at least one portion of the doorway visual and audio communications received from the video camera and external microphone, and for communicating the received cellular audio communications to the external speaker; and
    a cellular telephone disposed in the possession of the homeowner and remotely to the doorway and the control unit, the cellular telephone for capturing cellular audio communications at the cellular telephone, transmitting the cellular audio communications to the control unit, and rendering the at least one portion of doorway communications received from the control unit, thereby permitting the homeowner to monitor the home while away and the homeowner and individual to communicate as if the homeowner was at home.

20. The system as recited in claim 19, wherein the home comprises a structure selected from the group consisting of a house, an apartment, a loft, a condominium, and a townhouse.

\* \* \* \* \*